March 23, 1965    M. WALTON    3,174,587
ADJUSTABLE SHOCK ABSORBER
Filed March 12, 1964
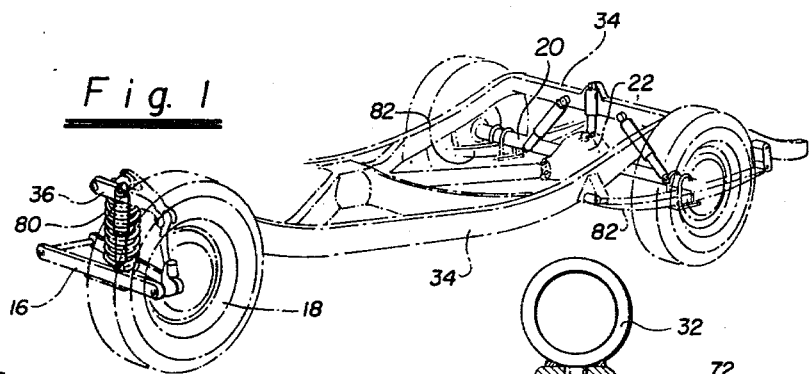
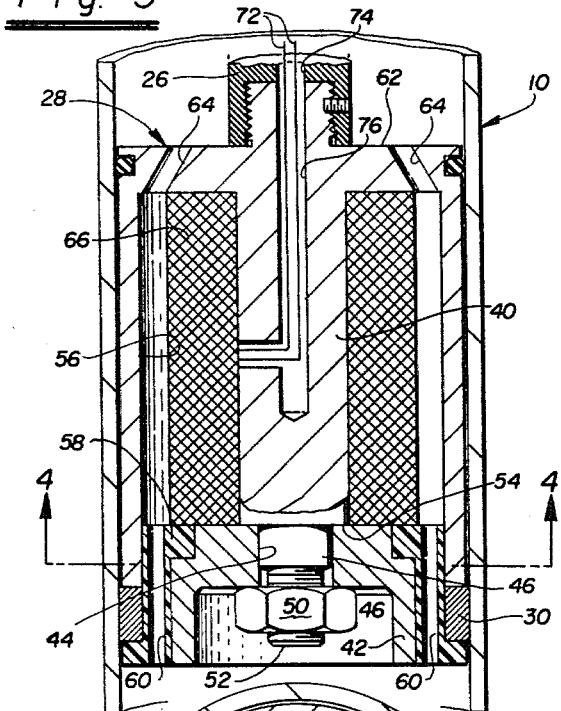
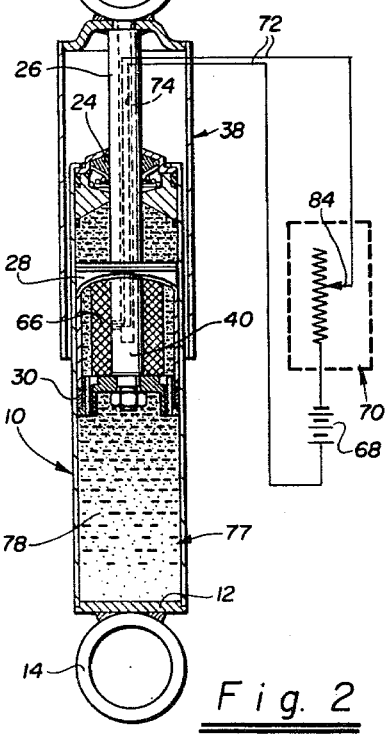
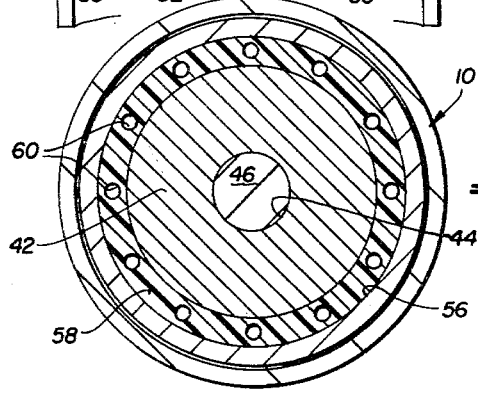
INVENTOR.
Marvin Walton
BY

3,174,587
ADJUSTABLE SHOCK ABSORBER
Marvin Walton, 134 Tuscaloosa Ave., Atherton, Calif.
Filed Mar. 12, 1964, Ser. No. 351,297
2 Claims. (Cl. 188—87)

The present invention relates to the devices known as "shock absorbers" which are employed in combination with springs to support the frame of a vehicle from its wheels. When the wheels of a vehicle encounter irregularities in the road or the vehicle makes a turn, the resultant compression and rebound of the springs sets up oscillations of the vehicle body that may become so serious on a bumpy and/or winding road as to cause the driver to lose control of the vehicle. Shock absorbers limit these spring-produced oscillations of the vehicle body in that they oppose yieldably the expansion and contraction of the springs. Their operation should be sufficiently strong to oppose further oscillations of the springs once they have returned to their normal condition and yet they should not be so strong as to nullify the benefits in comfort provided by the action of the springs when the wheels encounter irregularities in the road. In other words, for reasons of safety, it is desirable on the one hand that the shock absorbers be highly effective in limiting oscillations produced by the springs when the vehicle travels over a bumpy and/or winding road, and for reasons of comfort, i.e. for providing a smooth ride, it is desirable that their operation is relatively soft when the vehicle travels over a smooth road on which no severe irregularities or other obstacles are expected.

It is an object of my invention to provide a shock absorber whose mode of operation may be adjusted to adapt the vehicle to travel under different road conditions.

More specifically, it is an object of my invention to provide a shock absorber whose effectiveness in dampening the oscillations of the vehicle body may readily be adjusted by the driver, depending upon the expected road conditions, to provide the smoothest ride possible without jeopardizing safety.

These and other objects of the present invention will be apparent from the following description of the accompanying drawings which illustrate a preferred embodiment thereof and wherein FIGURE 1 is a perspective, largely in phantom lines, illustrating the location of shock absorbers in relation to the frame and the wheels of an automotive vehicle;

FIGURE 2 is a vertical central section through a shock absorber embodying my invention, with a part thereof broken away to expose structure located behind said part;

FIGURE 3 is an enlarged detail view of a portion of the structure shown in FIGURE 2, and FIGURE 4 is a section taken along line 4—4 of FIGURE 3 and viewed in the direction of the arrows associated with said line.

In most shock absorbers, the shock to be absorbed is taken up by a piston or plunger that bears against a body of liquid which is contained in a cylinder and which may escape from said cylinder under the force of the shock at a predetermined rate depending upon the size of a venting aperture in the cylinder and/or in the plunger itself and depending upon the consistency of the liquid in the cylinder. In accordance with the invention I employ a liquid having magnetic properties in the cylinders of shock absorbing devices and I provide a magnetizing winding in the vicinity of the venting aperture; and by varying the degree of energization of said winding and hence the strength of the magnetic field generated by the winding, I vary the consistency of the magnetic liquid and in this manner retard or accelerate the rate at which the liquid may escape through the vent and the plunger may yield to the shock to which it is subjected and/or may return to its normal condition under the urgency of the spring with which the shock absorber is associated.

The exemplary shock absorber to which my invention has been applied, is a simple direct-acting, telescopic shock absorber. It comprises a cylindrical container 10 which has a closed bottom 12 that is provided with an externally located ring 14 (FIG. 2) by means of which it may be pivotally supported from a suspension arm 16 of an automobile wheel 18 or from the rear axle housing 20 or the housing 22 of the differential transmission, as shown in FIGURE 1. The upper end of the container 10 is closed off hermetically by a cap 24 that is provided with a central aperture. Within said aperture is slidably received the rod 26 of a cylindrical piston or plunger 28 that is located within the cylindrical container and whose outer surface carries an annular gasket 30 that engages the cylindrical inner surface of the container in a liquid-tight manner (FIGURE 3).

The outwardly projecting end of the piston rod 26 is provided with a ring 32 similar to ring 14, by means of which the shock absorber may be pivotally connected to parts of the vehicle frame 34, such as the upper wheel suspension arm 36 shown in FIGURE 1. Near its upper end directly below the ring 32 the outwardly projecting end of the piston rod 26 carries firmly secured thereto a cylindrical dust shield 38 that is telescopically engaged over the cylindrical container 10.

The piston 28 is made of magnetizable material such as iron, and has the form of a hollow cylindrical pot provided with a centrally located cylindrical core 40 that is detachably secured to, and forms a direct continuation of, the piston rod 26 (FIGURE 2). The bottom of the pot is formed by a cylindrical plug 42 of magnetizable material which has a central aperture 44 by means of which it is engaged over a tenon 46 formed by the core 40; and a nut 50 engaged over the externally threaded end 52 of said tenon secures the plug 42 detachably to, and in close contact with, the bottom of the core 40 against an annular shoulder 54 formed by the core 40 around the tenon 46. The plug 42 is of an external diameter that is somewhat smaller than the internal diameter of the cylindrical wall 56 of the pot so that a narrow annular gap 57 is formed between the bottom plug and the outer wall of the pot. Received within said gap, and held tightly between the wall 56 and the plug 42 of the pot is an annular member 58 of a nonmagnetizable material, such as brass or a suitable plastic, and formed in said annular member are a plurality of angularly equi-spaced vertical channels or passages 60 that establish communication between the hollow interior of the piston and the interior of the cylindrical container 10 below said piston. The top 62 of the piston pot is likewise provided with a plurality of angularly equi-spaced channels or passages 64 that establish communication between the hollow interior of the piston and the interior of cylinder 10 above said piston. Wound about the core 40 of pot 28 is a multilayer magnetizing winding 66 that may be energized from an externally located source of electromotive force schematically represented by the battery 68 (FIGURE 2), through a rheostat 70 and a pair of leads 72 that pass through a suitable passage 74 in the piston rod 26 and a registering passage 76 in the core 40, to the external surface of said core (FIGURE 3).

The interior of the cylindrical container 10 is filled with a liquid 77 having magnetic properties. Such liquids may be formed by a suspension of ferromagnetic and/or paramagnetic particles indicated at 78 in FIGURES 2 and 3, within a suitable fluid carrier. Thus a suspension of carbonyl iron powder of an average size of 1 micron in a light weight hydro-carbon oil may be employed.

In practise shock absorbers are associated with springs, as pointed out hereinbefore, such as the coil spring 80 or the leaf 82 illustrated in FIGURE 1, and initially, when the spring is in the partially compressed condition determined by the weight of the chassis that rests upon the wheels of the vehicle, the shock absorber is partially expanded, and its piston 28 is located in the upper half of the cylindrical container 10. The magnetic fluid fills the space above the piston, its hollow interior between the wall 56 of the pot and the external surface of the magnetizing winding 66, and the space below the piston. When the spring with which the shock absorber is associated, is subjected to a shock, be it for the reason that the wheels encounter an obstruction or that the driver is forced to make a sudden turn, the resultant stress upon the shock absorber forces the piston against the liquid contained in the container 10 below said piston and the space between said piston and the bottom 12 of the container is contracted with a speed determined by the rate at which liquid may escape from the space below the piston through the passages 60 in the bottom of the piston pot, the hollow interior of the piston pot and the passages 64 in the top of the pot into the space above the piston. Thus, rapid compression and/or bending of the springs 80 or 82, respectively, is opposed by the action of the shock absorber, and vice versa, rapid re-expansion or straightening of the springs is likewise opposed by the operation of the shock absorber since the shock absorber may expand under the urgency of the stressed spring only at speed determined by the rate with which the liquid in the upper part of the cylindrical container may flow through the passages 64, the interior of the hollow piston pot and the passages 60 into the space below the piston.

By energizing the magnetizing winding 66 within the pot 28 so that it sets up a magnetic flux along the low reluctance path established by the core 40, the plug 42, the cylindrical wall 56 and the top 62 of the pot, a magnetic leakage field is set up in the annular gap of non-magnetizable material between the plug 42 and the side wall 56 of the magnetizable pot through which gap the magnetic liquid must pass in negotiating the channels 60 in the annular member 58 of non-magnetizable material (FIGURE 4). When the magnetic liquid is exposed to this magnetic field, the magnetizable particles contained therein orient themselves and conglomerate giving the appearance as if the liquid would thicken within the gap 57, to an extent depending upon the degree of energization of the magnetizing winding 66. Thus, by adjustment of the control arm 84 of rheostat 70 the consistency of the magnetic liquid may be changed in the vicinity of the channels 60 in a predeterminable manner. This affects the speed with which the liquid may pass through the channels 60 from the space below to the space above the piston and vice versa. In this manner the performance of the shock absorbers of my invention may be adjusted by the operator of a vehicle within a wide range to adapt them to expected road conditions. Accordingly the rheostat 70 is preferably located on the dash board of a car or truck within easy reach of the operator.

While I have explained my invention with the aid of a particular exemplary embodiment thereof, it will be understood that the invention is not limited ot the specific constructional details shown and described, and particularly not to the illustrated type of shock absorber. It may successfully be applied to any type of shock absorber whose performance is based upon the exchange of liquids through restricted passages.

I claim:
1. An adjustable shock absorber comprising a vessel having closed ends, a magnetic liquid within asid vessel, a hollow piston slidably received within said vessel, a magnetizing winding arranged within said hollow piston, said piston having a core portion located within said winding and peripherally located portions of magnetizable material to provide a low reluctance path for the magnetic flux produced by said winding, said portions being arranged to form a gap in said path, a member of non-magnetic material held within said gap and containing a channel establishing communication between the spaces within said vessel at either side of said piston, and means for energizing said magnetizing winding.

2. An adjustable shock absorber comprising a cylindrical vessel having closed ends, a magnetic liquid within said vessel, a hollow piston slidably received within said vessel, a magnetizing winding located within said piston, said piston having a core portion of magnetizable material located within said winding and a peripherally located shell portion of magnetizing material surrounding said winding, said portions being arranged to form an annular gap, a member of non-magnetizable material held within said gap and containing a channel establishing communication between the spaces within said vessel at either side of said piston, and manually adjustable means located exteriorly of said vessel for energizing said magnetizing winding to selected degrees.

References Cited by the Examiner

UNITED STATES PATENTS 2,661,596   12/53   Winslow _____ 188—88
2,940,749   1/60    Kemelhor _____ 188—88

FOREIGN PATENTS 976,917     3/51    France.
1,094,516   5/55    France.

ARTHUR L. LA POINT, *Primary Examiner.*

EUGENE G. BOTZ, *Examiner.*